Nov. 5, 1968          L. G. LARSON          3,408,854

GAS CHROMATOGRAPHY SENSING MEANS

Filed June 22, 1966          2 Sheets-Sheet 1

INVENTOR
L. G. LARSON
BY Young & Quigg
ATTORNEYS

Nov. 5, 1968          L. G. LARSON          3,408,854
GAS CHROMATOGRAPHY SENSING MEANS
Filed June 22, 1966                    2 Sheets-Sheet 2

INVENTOR
L. G. LARSON
BY Young & Quigg
ATTORNEYS

United States Patent Office 3,408,854
Patented Nov. 5, 1968

3,408,854
GAS CHROMATOGRAPHY SENSING MEANS
Lewis G. Larson, Bartlesville, Okla., assignor to Phillips Petroleum Company, a corporation of Delaware
Filed June 22, 1966, Ser. No. 559,612
4 Claims. (Cl. 73—23.1)

ABSTRACT OF THE DISCLOSURE

A first sample of a fluid to be analyzed is subjected to a first chromatographic separation with a high thermal conductivity carrier gas, and a second sample of the fluid to be analyzed is subjected to a second chromatographic separation with a low thermal conductivity carrier gas. First and third thermistors are positioned as reference detectors in said high thermal conductivity carrier gas and said low thermal conductivity carrier gas, respectively. Second and fourth thermistors are positioned as measuring detectors in the effluent of said first and second chromatographic separations, respectively. The four thermistors are connected in a Wheatstone bridge circuit so that similar changes in the first and second thermistors or in the third and fourth thermistors balance out each other, and so that the detection of a low thermal conductivity component by said second thermistor and the detection of a high thermal conductivity component by the fourth thermistor will produce the same polarity output. The first and fourth thermistors can be separately connected in a first pair of opposite arms of the bridge, with the second and third thermistors being separately connected in the second pair of opposite arms; or the first and fourth thermistors can be connected together in one arm, the second and third thermistors being connected together in an adjacent arm.

---

Figure 1:
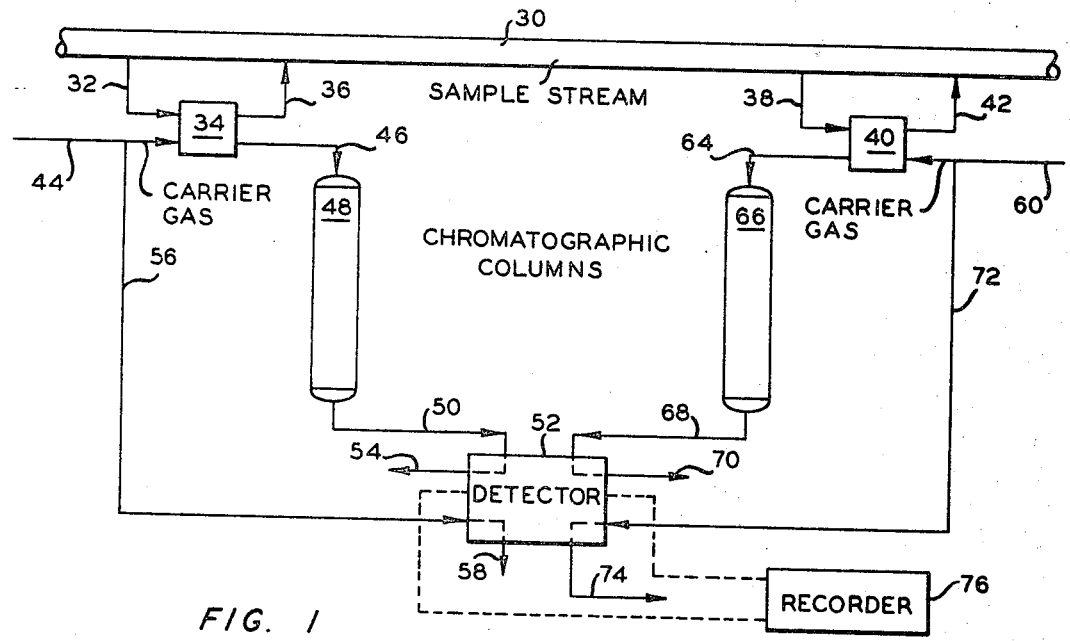

This invention relates to a detector for a gas chromatography analysis. In one of its aspects it relates to a detector for a sensing gaseous components in a carrier gas stream in which a high thermal conductivity carrier gas is used in sensing low thermal conductivity gaseous components and a low thermal conductivity carrier gas is used in sensing high thermal conductivity gaseous components, the sensing means comprising a balance circuit having a sensing thermistor and a reference thermistor for each carrier gas, the thermistors being so connected in the balance circuit such that an increase or decrease in the resistance of the thermistors due to the high thermal conductivity or low thermal conductivity carrier gas will not be reflected in the circuit balance.

In copending application Ser. No. 559,606, filed June 22, 1966, there is disclosed and claimed a method and apparatus for sampling a gas stream containing high thermal conductivity and low thermal conductivity components. In this application, a high thermal conductivity carrier gas and a low thermal conductivity carrier gas are used to pass separate samples through separate chromatographic columns at the same time or through the same column at different times. The separated sample streams are then passed from the gas chromatography column to a thermistor detecting means in which the high thermal conductivity carrier gas is passed to one side of a balance circuit and the low thermal conductivity carrier gas is passed to the other side of the balance circuit. A thermistor on the low thermal conductivity side of the balance circuit balances a thermistor on the high thermal conductivity side of the balance circuit.

It has been found that in this system using two thermistors and two carrier gases, that the different carrier gases affect the thermistors differently. For example, the temperature and flow rate of one carrier gas could be different than the other carrier gas. Further, the aging characteristics of the thermistors under the influence of the high thermal conductivity carrier gas, such as hydrogen, is different from that of the low thermal conductivity carrier gas. Aging of the thermistors also changes the resistance, thereby changing the circuit balance.

I have now discovered that the thermistor resistance changes due to carrier gas differences can be avoided if a reference thermistor is placed in the balance circuit for each carrier gas used. The thermistors will be so connected in the circuit that a change in the resistance of the thermistors due to a carrier gas will not be reflected in the circuit balance.

By various aspects of this invention, one or more of the following, or other, objects can be obtained.

It is an object of this invention to provide a detecting means for a chromatographic analyzer in which a high conductivity gas and a low conductivity gas are used as carrier gases for sampling a stream containing both high and low thermal conductivity gases.

It is a further object of this invention to provide a method and apparatus for sensing gaseous components in a high and low thermal conductivity gas wherein changes in the resistivity of the detecting means due to effects of the carrier gas are not reflected in the detecting means output.

It is a still further object of this invention to provide a balance circuit for detecting gaseous components in a high thermal conductivity carrier gas and in a low thermal conductivity carrier gas wherein the effect of the carrier gas on the sensing components in the balance circuit is not reflected in the balance circuit output.

Other aspects, objects, and several advantages of this invention are apparent to one skilled in the art from a study of this disclosure, the drawings, and the appended claims.

According to the invention, there is provided a balancing circuit to detect components contained in a high thermal conductivity carrier gas and a low thermal conductivity carrier gas. The balancing circuit contains four thermistors, one thermistor for sensing the components of a high thermal conductivity carrier gas, one thermistor for referencing the high thermal conductivity carrier gas, one thermistor for measuring components in a low thermal conductivity carrier gas, and one thermistor for referencing the low thermal conductivity carrier gas thermistor. The thermistors are so arranged in the balance circuit so that a change in the low conductivity carrier gas or the high conductivity carrier gas thermistors will not be reflected in the output of the balance circuit. The thermistors are also so arranged such that the high thermal conductivity carrier gas thermistors act as constant resistances in the circuit when the sample is detected in the low thermal conductivity carrier gas and vice versa.

Figure 2:
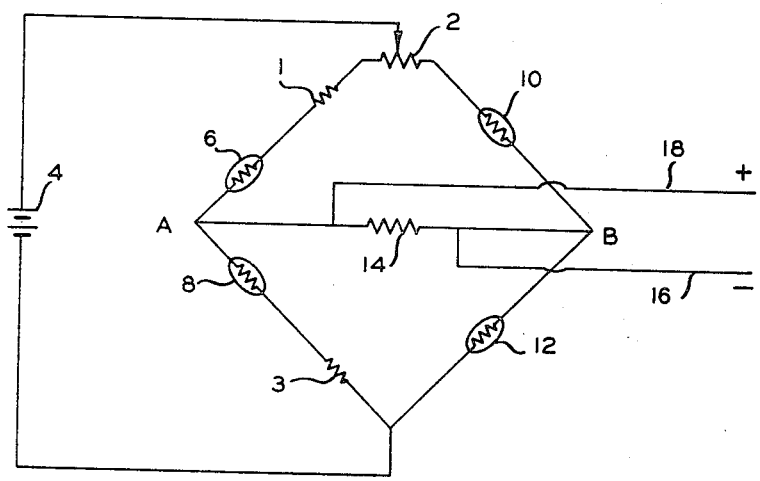
Figure 3:
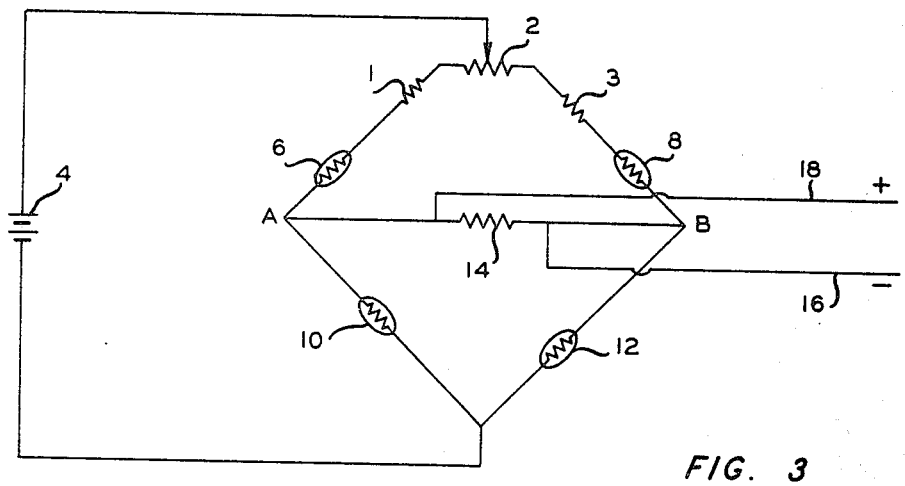
Figure 4:
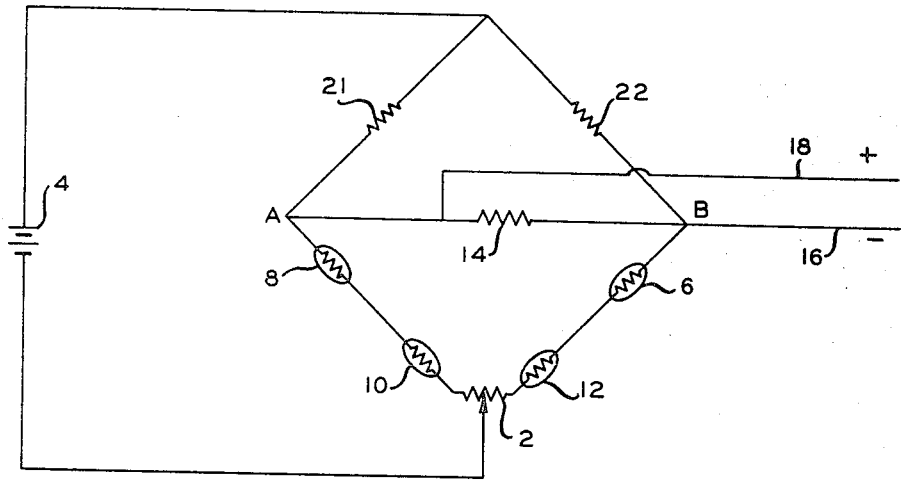

The invention will now be described with reference to the accompanying drawings in which FIGURE 1 is a schematic showing a flow diagram for a gas chromatography analysis in which a high thermal conductivity carrier gas and a low thermal conductivity carier gas are used; FIGURE 2 is a schematic representation of a balance circuit according to the invention; FIGURE 3 is a schematic representation of a modification of the invention and FIGURE 4 is a schematic showing still another modification of the invention.

Referring now to FIGURE 1, gas stream to be sampled in line 30 passes through line 32 to sampling valve 34 and unused sample passes through line 36 back into line 30. A high thermal conductivity carrier gas, for example, hydrogen or helium, passes through line 44 into sampling valve 34 and carries a sample through line 46 through gas chromatography column 48. Sampling valve 34 can be any suitable valve which will sample a predetermined portion of gas in line 32. A suitable valve is disclosed and claimed in U.S. 3,140,615 to Arthur B. Broerman. Gas chromatography column 48 as well as gas chromatography column 66 can be any suitable column which will separate a hydrocarbon stream into components. High thermal conductivity carrier gas containing separated components is removed from column 48 through line 50 and passed through detecting means 52 wherein the presence of hydrocarbon components will be sensed and the gas stream is removed through line 54. A portion of the carrier gas in 44 is passed through line 56 to a reference detector in 52 and is removed through line 58. The output from detector 52 is connected to a means 76 to record or indicate the signals sensed in 52. Means 76 can be a galvanometer, a recorder or a computer which calculates the percentage of components in the sample stream as a function of the output of the detector.

A second sample in line 30 is removed through line 38, sampled in valve 40, passed through line 64 in a low thermal conductivity carrier gas such as nitrogen or argon to gas chromatography column 66. A portion of the sample gas in line 38 which is not picked up by carrier gas is passed back to flowing stream 30 through line 42. Carrier gas in line 60 is a low thermal conductivity carrier gas such as nitrogen or argon. Components separated in column 66 pass through line 68 into detector 52 and out through line 70. Detector 52 will detect principally high conductivity components in the sample stream. A portion of the carrier gas in line 60 is passed through line 72 to detector 52 in which it references the low thermal conductivity sensing means and is removed from detector 52 through line 74.

Referring now to FIGURE 2, a power source 4 applies a voltage across the balance circuit. A zero balance point potentiometer 2 is connected in series on one side of resistance 1 and low thermal conductivity detector 6. Detector 6 is a thermistor whose resistance is highly temperature sensitive. Low thermal conductivity carrier gas from line 72 flows past thermistor 6. Potentiometer 2 is also connected in series to thermistor 10 which in this embodiment serves as a reference detector for the high thermal conductivity carrier gas which flows in line 56. The high thermal conductivity carrier gas is passed over thermistor 10. A resistor 14 is connected across the two sides of the balance circuit and leads 16 and 18 are attached to a recording means 76. The recording means will record the voltage drop across resistor 14. The voltage drop across resistor 14 is representative of the circuit unbalance. In normal operation, when sample is not passing through the detector, there should be no voltage across resistor 14. Thermistor 6 is connected to thermistor 8 which is connected in series with resistor 3. Thermistor 8 is used to sense high conductivity gaseous components which would be present in the low thermal conductivity carrier gas. With reference to FIGURE 1, the carrier gas in line 68 having separated gaseous components would pass over thermistor 8. Thermistor 12, which senses low thermal conductivity gaseous components in line 50 which passes over thermistor 12 is connected to thermistor 10 and resistor 3. As can be seen from FIGURE 2, a potential is applied across the juncture of resistor 3 with thermistor 12 and potentiometer 2.

In operation, with no sample flowing through the detector, current flows from 4 through potentiometer 2, resistor 1, thermistor 6, thermistor 8 and resistor 3 back to the opposite side of 4. Current also flows through thermistor 10, thermistor 12. No current will flow across resistor 14. When low thermal conductivity gaseous components are sensed in thermistor 12, the temperature of thermistor 12 will increase. This increase in temperature will decrease the resistance across thermistor 12 thereby causing current to flow across resistor 14, tending to go from 18 to 16. This will give a positive reading on the recorder. When high conductivity gas, such as hydrogen, flowing in the low conductivity carrier gas is sensed by thermistor 8, the temperature of the thermistor will be decreased since hydrogen has a negative effect on the thermistor. Thus, the resistance of thermistor 8 will increase, causing current to flow across resistor 14 to thermistor 12, flowing also from 18 to 16 thereby also giving a positive reading on the recording device.

In the event that either carrier gas changes the characteristics of the thermistors, this change will not be reflected across the balance circuit. For example, if the flow rate of the low conductivity carrier gas should change across thermistors 6 and 8, both of these resistances would change a corresponding amount. Thus, there would be no difference in the potential across resistor 14. The same is true if there were changes in the high conductivity carrier gas which affected thermistors 10 and 12. Further, if the mandrel temperature changes or the temperature of either carrier gas changes, the thermistors 6 and 8 and/or thermistors 10 and 12 would change by corresponding amounts so that there would be no reflection of the differences across resistor 14.

Referring now to FIGURE 3 there is shown another embodiment of the invention shown in FIGURE 2 where like numbers have been used to designate like parts. In this embodiment, both sensor thermistors 8 and 12 are on the same side of the balance circuit. Further, resistors 1 and 3 have been placed in different places in the circuit. Thermistor 8 is connected to resistor 3 whereas reference thermistor 10 is connected on the other side of the balance circuit to thermistor 6 and to high conductivity thermistor 12. Thermistor 6 is connected in series with resistor 1 and potentiometer 2. In this embodiment, high thermal conductivity reference gas flowing in line 56 would be passed over thermistor 10 and low thermal conductivity carrier gas including the eluted sample in line 68 would be passed over thermistor 8. The operation in all other respects would be the same as that shown in FIGURE 2.

Referring now to FIGURE 4 still another embodiment of the invention is shown, wherein as in FIGURE 3 like numbers have been used to designate like parts. In this embodiment, the zero adjusting potentiometer 2 and all thermistors have been placed in one end of the balance circuit. In this circuit, thermistor 8 is connected to thermistor 10 and thermistor 6 is connected to thermistor 12. Also, resistors 21 and 22 have been placed in the circuit to limit current flow. Preferably, resistors 21 and 22 are of greater value than 1 and 3. The operation of this embodiment is the same as the operation of the embodiment shown in FIGURES 2 and 3. In other words, high thermal conductivity sample passing over thermistor 8 will cause current to flow from 16 to 18 across resistor 14, and low thermal conductivity sample passing over thermistor 12 will cause current to flow from 16 to 18 through resistor 14. Changes such as temperature, pressure, etc., in the carrier gas which cause changes in the thermistors 6 and 8, for example, will not reflect any change in potential across 16 or 18. Like changes in thermistors 10 and 12 will not reflect any change in the potential across 16 and 18.

It has been found in carrying out the invention that the thermistor's life can be increased by using more inert carrier gases, such as nitrogen, argon and helium. Whereas hydrogen can also be used as a high thermal conductivity carrier gas, it has been found to decrease the life span of the thermistors and is not preferred.

Reasonable variation and modification are possible within the scope of the foregoing disclosure, the drawings, and the claims to the invention without departing from the spirit thereof.

I claim:

1. A sensing means for a two carrier gas chromatographic analyzer system comprising a balance circuit having
    (a) a means to sense circuit unbalance,
    (b) a first thermistor means, a second thermistor means, means to pass a high thermal conductivity carrier gas over said second thermistor, means to pass said high thermal conductivity carrier gas containing sample from a gas chromatography column over said first thermistor means, said first and second thermistor means being so connected in said balance circuit that like changes in each of said first and second thermistor means will not be reflected in said circuit unbalance sensing means, (c) a third thermistor means, a fourth thermistor means, (d) means to pass a low thermal conductivity carrier gas to said fourth thermistor means, (e) means to pass said low thermal conductivity carrier gas containing sample from a gas chromatography column over said third thermistor means, said third and fourth thermistor means being so connected in said balance circuit such that like changes in the resistance of each of said third and fourth thermistor means will not be reflected in said circuit unbalance sensing means, (f) said first and third thermistor means being so connected in said circuit that the sensing of a low thermal conductivity gas by said first thermistor means will cause the same direction of circuit unbalance as seen by said unbalance sensing means as an unbalance created by sensing a high thermal conductivity gas by said third thermistor means.

2. A sensing means according to claim 1 wherein said balance circuit is a bridge circuit in which a potential is supplied across a first side and a second side connected in parallel, said first side containing said first and second thermistor means, and said second side containing said third and fourth thermistor means, and said sensing means senses the unbalance across the connection of said first and second thermistor means and the connection of said third and fourth thermistor means.

3. A sensing means according to claim 1 wherein said balance circuit is a bridge circuit and a potential is supplied across a first and second side in parallel, said first side containing said first and said third thermistor means and said second side containing said second and said fourth thermistor means, said circuit unbalance sensing means being connected across the connection of said first and third thermistor means and the connection of said second and fourth thermistor means.

4. A sensing means according to claim 1 wherein said balance circuit is a bridge circuit and a potential is supplied across a first and second side in parallel, said first side containing said first and fourth thermistor means, and said second side containing said second and third thermistor means, all thermistor means being at one end of said balance circuit.

References Cited

UNITED STATES PATENTS 3,097,518   7/1963   Taylor et al. _____ 73—23.1

OTHER REFERENCES

Fisher Scientific Co., Model 25, Gas Partitioner, September 1960, TD 146 (Bulletin).

Analytical Chemistry, vol. 28, 1956, "Gas Chromatography," M. Dimbat et al., pp. 290–294.

RICHARD C. QUEISSER, *Primary Examiner.*

VICTOR J. TOTH, *Assistant Examiner.*